US008411240B2

(12) United States Patent
Harada et al.

(10) Patent No.: US 8,411,240 B2
(45) Date of Patent: Apr. 2, 2013

(54) LIQUID CRYSTAL DISPLAY DEVICE AND METHOD OF DRIVING LIQUID CRYSTAL DISPLAY DEVICE

(75) Inventors: Kenji Harada, Nomi (JP); Takamitsu Fujimoto, Kanazawa (JP); Takahiro Oonuma, Nonoichi (JP)

(73) Assignee: Japan Display Central Inc., Fukaya-shi (JP)

( * ) Notice: Subject to any disclaimer, the term of this patent is extended or adjusted under 35 U.S.C. 154(b) by 0 days.

(21) Appl. No.: 13/399,120

(22) Filed: Feb. 17, 2012

(65) Prior Publication Data

US 2012/0212472 A1 Aug. 23, 2012

(30) Foreign Application Priority Data

Feb. 21, 2011 (JP) ................................. 2011-034512

(51) Int. Cl.
*G02F 1/1337* (2006.01)

(52) U.S. Cl. ............ 349/130; 349/42; 349/84; 349/122; 349/123; 349/138

(58) Field of Classification Search .................... 349/19, 349/33, 41, 42, 84, 122, 123, 130, 138
See application file for complete search history.

(56) References Cited

U.S. PATENT DOCUMENTS

| | | | | |
|---|---|---|---|---|
| 5,815,223 | A * | 9/1998 | Watanabe et al. | 349/42 |
| 6,624,857 | B1 * | 9/2003 | Nagata et al. | 349/54 |
| 7,705,822 | B2 | 4/2010 | Harada | |
| 8,188,964 | B2 * | 5/2012 | Tsuruta | 345/100 |
| 2010/0109990 | A1 | 5/2010 | Harada | |
| 2011/0102405 | A1 | 5/2011 | Harada | |

FOREIGN PATENT DOCUMENTS

| | | |
|---|---|---|
| JP | 2004-45785 | 2/2004 |
| JP | 2004-226597 | 8/2004 |
| JP | 2005-49849 | 2/2005 |

OTHER PUBLICATIONS

Office Action mailed Jan. 22, 2013, in Japanese Patent Application No. 2011-034512, filed Feb. 21, 2011 (with English-language translation).

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

According to one embodiment, a liquid crystal display device includes a first substrate, a second substrate, a liquid crystal layer, scanning lines, signal lines, pixel switches, first electrodes, a scanning line drive circuit, a second electrode, a voltage supply wiring, a control mechanism, a first switching mechanism, a second switching mechanism, and an output timing switching mechanism. The output timing switching mechanism is configured to simultaneously output a second scanning signal of switching the pixel switch into conductive state to the scanning lines, based on the control signal.

7 Claims, 7 Drawing Sheets

LIQUID CRYSTAL DISPLAY DEVICE AND METHOD OF DRIVING LIQUID CRYSTAL DISPLAY DEVICE

CROSS-REFERENCE TO RELATED APPLICATIONS

This application is based upon and claims the benefit of priority from prior Japanese Patent Application No. 2011-034512, filed Feb. 21, 2011, the entire contents of which are incorporated herein by reference.

FIELD

Embodiments described herein relate generally to a liquid crystal display device and a method of driving the liquid crystal display device.

BACKGROUND

A liquid crystal display device attracts attention due to advantages such as light weight, thin form, low power consumption, and the like. An active-matrix type liquid crystal display device includes a liquid crystal layer held between a pair of substrates which face each other, and a display portion constituted by a plurality of pixels arranged in a matrix form. At the display portion, One of the pair of substrates includes scanning lines arranged along row lines in which the pixels are arranged, and signal lines arranged along column lines in which the pixels are arranged. An alignment state of the liquid crystal molecules contained in the liquid crystal layer is controlled by an electrical field applied to the liquid crystal layer.

In particular, liquid crystal display devices of an IPS (In-Plane Switching) method and a FFS (Fringe Field Switching) method have advantages such as wide view angle and low power consumption, and are widely applied for the purposes of displays such as television sets and portable telephones. Such liquid crystal display devices includes a plurality of first electrodes (pixel electrode) arranged in the matrix form and a second electrode (common electrode) that faces the first electrodes on one of the pair of substrates, and the state of an alignment of the liquid crystal molecules contained in the liquid crystal layer is controlled by the horizontal electrical field generated between the first and second electrodes.

In particular, recently, a demand for providing a user interface on a display surface for improving operability is increasing, and products with a contact sensing element on the display surface of the liquid crystal display device are expanding in the market.

DETAILED DESCRIPTION

Figure 1:
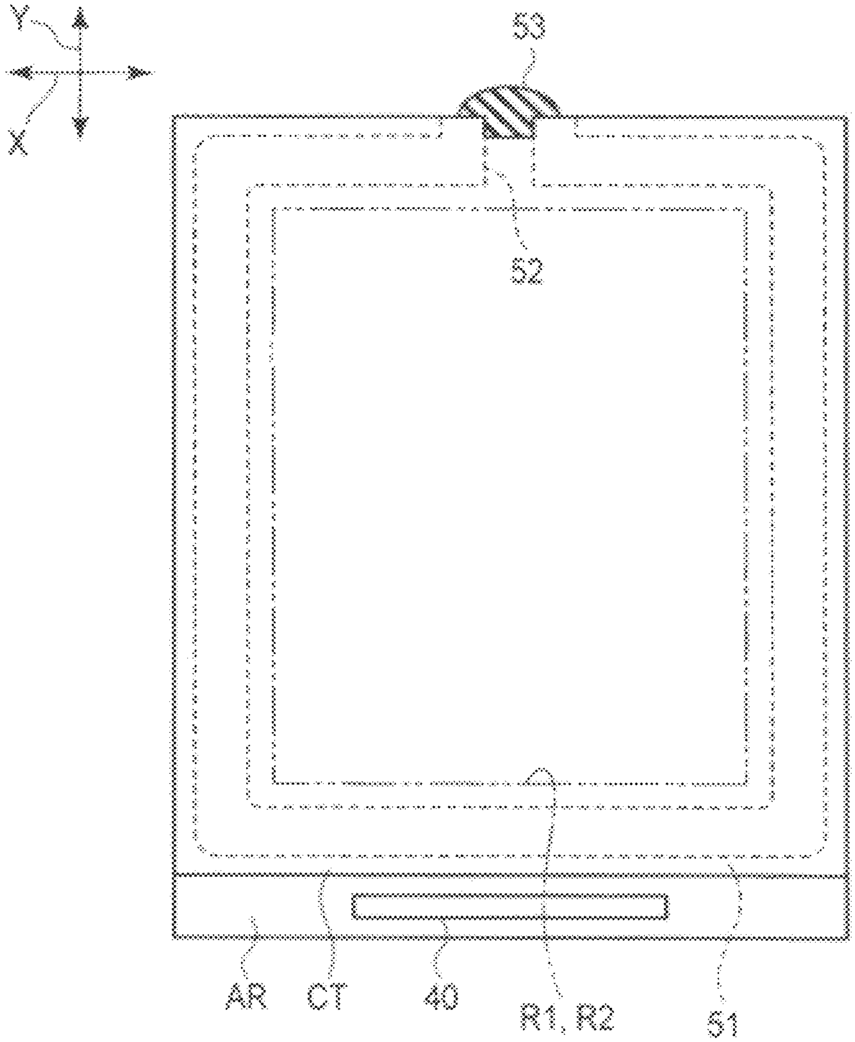
FIG. 1 is a plan view illustrating a liquid crystal display device according to an embodiment.

In general, according to one embodiment, there is provided a liquid crystal display device comprising: a first substrate; a second substrate arranged opposite to the first substrate; a liquid crystal layer held between the first substrate and the second substrate; a plurality of scanning lines provided on the first substrate and extending in a row direction; a plurality of signal lines provided on the first substrate and extending in a column direction; a plurality of pixel switches provided on the first substrate and electrically connected to the scanning lines and the signal lines; a plurality of first electrodes arranged in a matrix form on the first substrate and electrically connected to the pixel switches; a scanning line drive circuit configured to output a first scanning signal in order in association with the scanning lines; a second electrode provided on the first substrate or the second substrate and configured to apply an electric field produced between the second electrode and the first electrodes to the liquid crystal layer; a voltage supply wiring configured to supply a common voltage; a control mechanism configured to output a control signal; a first switching mechanism connected between the second electrode and the voltage supply wiring and configured to switch the second electrode and the voltage supply wiring into either conductive state or non-conductive state based on the control signal given by the control mechanism; a second switching mechanism connected between the signal lines and the voltage supply wiring and configured to switch the signal lines and the voltage supply wiring into either conductive state or non-conductive state based on the control signal given by the control mechanism; and an output timing switching mechanism configured to connect between the scanning lines and the scanning line drive circuit, receive the first scanning signal from the scanning line drive circuit and the control signal from the control mechanism, and simultaneously output a second scanning signal of switching the pixel switch into conductive state to the scanning lines, based on the control signal.

According to another embodiment, there is provided a method of driving a liquid crystal display device. The liquid crystal display device comprises: a first substrate; a second substrate arranged opposite to the first substrate; a liquid crystal layer held between the first substrate and the second substrate; a plurality of scanning lines provided on the first substrate and extending in a row direction; a plurality of signal lines provided on the first substrate and extending in a column direction; a plurality of pixel switches provided on the first substrate and electrically connected to the scanning lines and the signal lines; a plurality of first electrodes arranged in a matrix form on the first substrate and electrically connected to the pixel switches; a scanning line drive circuit configured to output a first scanning signal in order in association with the scanning lines; a second electrode provided on the first substrate or the second substrate and configured to apply an electric field produced between the second electrode and the first electrodes to the liquid crystal layer; a voltage supply wiring configured to supply a common voltage; a control mechanism configured to output a control signal; a first switching mechanism connected between the second electrode and the voltage supply wiring and configured to switch the second electrode and the voltage supply wiring into either conductive state or non-conductive state based on the control signal given by the control mechanism; a second switching mechanism connected between the signal lines and the voltage supply wiring and configured to switch the signal lines and the voltage supply wiring into either conductive state or non-conductive state based on the control signal given by the control mechanism; and an output timing switching mechanism configured to connect between the scanning lines and the scanning line drive circuit, receive the first scanning signal from the scanning line drive circuit and the control signal from the control mechanism, and simultaneously output a second scanning signal of switching the pixel switch into conductive state to the scanning lines, based on the control signal. The method comprises: outputting the control signal, when a power supply is turned off; and simultaneously outputting the second scanning signal to the scanning lines, switching the second electrode and the voltage supply wiring into conductive state, switching the signal lines and the voltage supply wiring into conductive state, and supplying the common voltage to the first electrodes and the second electrode, based on the control signal.

A liquid crystal display device and a method of driving the liquid crystal display device according to an embodiment will be hereinafter explained in detail with reference to drawings. In the present embodiment, the liquid crystal display device has a function of detecting input position information, and comprises pixel electrodes and a common electrode on one of substrates. The liquid crystal display device employs an FFS (Fringe Field Switching) mode as a liquid crystal display mode in which horizontal electric field formed therebetween is used to switch liquid crystal molecules, and normally black.

As shown in FIGS. 1 to 5, the liquid crystal display device is an active matrix type liquid crystal display device, and comprises a liquid crystal display panel LPN. The liquid crystal display panel LPN comprises an array substrate AR serving as a first substrate, a counter substrate CT serving as a second substrate, and a liquid crystal layer LQ. The counter substrate CT is arranged opposite to the array substrate AR with a predetermined gap therebetween. The liquid crystal layer LQ is held between the array substrate AR and the counter substrate CT. The liquid crystal display device includes a display region R1 for displaying an image and an input region R2 overlapping the display region R1. In the display region R1, a plurality of pixels PX are provided in m by n matrix form.

The array substrate AR is formed using an insulating substrate 20 having light transparency such as glass or quartz plate. In the display region R1, there are provided, on the insulating substrate 20, m by n pixel electrodes PE respectively arranged for the pixels PX, n scanning lines GL (GL1 to GLn) respectively extending in a row direction X of each pixel PX, m signal lines SL (SL1 to SLm) respectively extending in a column direction Y of each pixel PX, m by n pixel switches SWP arranged in proximity to positions where the scanning lines GL and the signal lines SL cross each other, and a common electrode ET arranged to face the pixel electrodes PE with a second insulating layer 14 interposed therebetween. In this embodiment, the pixel electrode PE is a first electrode, and the common electrode ET is a second electrode.

The pixel switch SWP has a TFT (thin film transistor) as a switching element. A gate electrode WG of a pixel switch SWP is electrically connected (or integrally formed with) a corresponding scanning line GL. A source electrode WS of a pixel switch SWP is electrically connected (or integrally formed with) a corresponding signal line SL. A drain electrode WD of a pixel switch SWP is electrically connected (or integrally formed with) a corresponding pixel electrode PE.

When an ON voltage is applied to the gate electrode WG of the pixel switch SWP, this makes conduction between the source electrode WS and the drain electrode WD, and the video signal is provided from the corresponding signal line SL to the pixel electrode PE. A liquid crystal capacitance is formed by the video signal applied to the pixel electrode PE and the common voltage applied to the common electrode ET.

For example, the pixel electrode PE is provided with slits ST with a predetermined interval, and horizontal electric field is generated between the pixel electrode PE and the common electrode ET arranged with the second insulating layer 14 interposed therebetween. When this horizontal electric field is applied to the liquid crystal layer LQ, the alignment state of the liquid crystal molecules contained in the liquid crystal layer LQ is controlled. Each pixel PX further includes an auxiliary capacitance CS coupled with the liquid crystal capacitance. The liquid crystal capacitance is stored in the liquid crystal layer by the electric field applied to the liquid crystal layer LQ. The auxiliary capacitance CS is a capacitance generated between the pixel electrode PE and the common electrode ET.

Now, the configuration of the above pixel PX will be explained.

An undercoat insulating film 1 is deposited on the insulating substrate 20. A semiconductor layer SC made of polysilicon is formed on the undercoat insulating film 1, and a gate insulating film 2 is deposited on the undercoat insulating film and the semiconductor layer. On the gate insulating film 2, the scanning lines GL, the gate electrodes WG, and the first electrodes 3 are arranged. The gate electrode WG faces the semiconductor layer SC with the gate insulating film 2 interposed therebetween.

A layer insulating film 6 is formed on the gate insulating film 2, the scanning lines GL, the gate electrodes WG, and the first electrodes 3. The layer insulating film 6 is formed by laminating a first layer insulating film 4 and a second layer insulating film 5 having function of passivation film. The first layer insulating film 4 and the second layer insulating film 5 are deposited in order on the gate insulating film 2.

The signal lines SL, the source electrodes WS, the drain electrodes WD, and second electrodes 7 are formed on the layer insulating film 6. The source electrode WS is electrically connected to the source region RS of the semiconductor layer SC pass through a contact hole formed in the gate insulating film 2 and the layer insulating film 6. The drain electrode WD is electrically connected to the drain region RD of the semiconductor layer SC pass through the contact hole formed in the gate insulating film 2 and the layer insulating film 6.

The second electrode 7 is electrically connected to the first electrode 3 pass through a contact hole formed in the gate insulating film 2 and the layer insulating film 6. The first electrode 3 and the second electrode 7 form a common wire COM explained later.

A first insulating layer 11 is formed on the layer insulating film 6, the pixel switch SWP, the signal lines SL, and the second electrodes 7. The first insulating layer 11 includes a contact hole 11*h* overlapping the drain electrode WD and a contact hole overlapping the second electrode 7.

A common electrode ET made of a transparent conductive material such as ITO (indium tin oxide) is formed on the first insulating layer 11. The common electrode ET is arranged in a matrix form. The common electrode ET is electrically connected to the second electrode 7 pass through the contact hole. A second insulating layer 14 is formed on the first insulating layer 11 and the common electrode ET. The second insulating layer 14 has another contact hole 14*h* overlapping the drain electrode WD.

A pixel electrode PE made of a transparent conductive material such as ITO is formed on the second insulating layer 14. The pixel electrode PE is arranged in the matrix form. The pixel electrode PE faces the common electrode ET, and is electrically connected to the drain electrode WD pass through the contact hole 14*h*. An alignment film 22 is deposited on the second insulating layer 14 and the pixel electrodes PE. The alignment film 22 is arranged on a surface of the array substrate AR in contact with the liquid crystal layer LQ.

On the other hand, the counter substrate CT is formed using an insulating substrate 30 having light transparency such as glass or quartz plate. In particular, in the color display type liquid crystal display device, the counter substrate CT comprises a black matrix 32 for dividing the respective pixels PX and a color filter layer 34 arranged in the respective pixels enclosed by the black matrix 32. The black matrix 32 and the color filter layer 34 is located on the insulating substrate 30. Further, the counter substrate CT may be configured to include, e.g., a shield electrode for alleviating the influence of external electric field and an overcoat layer arranged with a relatively thick film thickness for planarizing unevenness on the surface of the color filter layer 34.

The black matrix 32 is arranged on the insulating substrate 30 to face the scan lines GL, the signal lines SL, and a wiring for the pixel switches SWP arranged on the array substrate AR. The color filter layer 34 is formed with colored resins colored in colors different from each other, e.g., three primary colors such as red, green, and blue. The red colored resin, the blue colored resin, and the green colored resin are arranged to respectively correspond to a red pixel, a blue pixel, and a green pixel. A surface of the counter substrate CT in contact with the liquid crystal layer LQ is arranged with an alignment film 36.

When the array substrate AR and the counter substrate CT are arranged such that the alignment film 22 thereof and the alignment film 36 thereof face each other, a predetermined gap is formed by a spacer, not shown, arranged therebetween. Peripheral portions of the array substrate AR and the counter substrate CT are bonded with a sealing member 51. The liquid crystal layer LQ is formed with a liquid crystal composition sealed into a space enclosed by the array substrate AR, the counter substrate CT, and the sealing member 51. A liquid crystal inlet 52 formed in a portion of the seal member 51 is sealed with a sealant 53.

Further, the liquid crystal display device includes an optical device OD1 and an optical device OD2. The optical device OD1 is provided on one external surface of the liquid crystal display panel LPN (i.e., an external surface opposite to a surface in contact with the liquid crystal layer LQ at the array substrate AR). The optical device OD2 is provided on the other external surface of the liquid crystal display panel LPN (i.e., an external surface opposite to a surface in contact with the liquid crystal layer LQ at the counter substrate CT). Each of the optical devices OD1 and OD2 includes polarizer, and achieve, e.g., normally black mode in which the transmittance of the liquid crystal display panel LPN is the lowest (i.e., displaying black) when no voltage is applied to the liquid crystal layer LQ.

According to this configuration, the liquid crystal display panel LPN selectively transmits backlight emitted from a backlight unit provided at the side of the array substrate AR with respect to the liquid crystal display panel LPN, so that an image is displayed. The slits ST formed in the pixel electrode PE generally extend along the row direction X, wherein the slits ST are formed to cross the row direction X with an acute angle. The slits ST are arranged with a gap therebetween in the column direction Y.

More specifically, one pixel electrode PE includes slits extending at least two directions, and for example, includes a plurality of slits ST1 having a longer axis AX1 along a first direction and a plurality of slits ST2 having a longer axis AX2 along a second direction different from the first direction. The longer axis AX1 is inclined to form an angle θ1 of about 7 degrees with respect to the row direction X. The longer axis AX2 is inclined to form an angle θ2 of about 7 degrees with respect to the row direction X. In other words, these longer axes AX1 and AX2 are arranged to be substantially symmetrical with respect to the row direction X. The plurality of slits ST1 are arranged in parallel to each other. The plurality of slits ST2 are arranged in parallel to each other. The rubbing directions of the alignment film 22 and the alignment film 36 are set to be in parallel to the row direction X.

In this configuration, when no electric field is formed between the pixel electrode PE and the common electrode ET, the liquid crystal molecules included in the liquid crystal layer LQ are oriented in parallel to the rubbing direction by restricting force of the alignment film 22 and the alignment film 36. In this state, after the backlight passes through the liquid crystal display panel LPN, the backlight is absorbed by the polarizer included in the optical device OD2 (i.e., displayed in black).

On the other hand, when a potential difference is formed between the pixel electrode PE and the common electrode ET, an electric field E is formed in a direction perpendicular to the edges of the slits ST pass through the slits ST. With this electric field E, the liquid crystal molecules are switched (i.e., the liquid crystal molecules are oriented in a direction parallel to the electric field E). At this occasion, in proximity to the slit ST1, the liquid crystal molecules are pivoted to the left (counterclockwise), and in proximity to the slit ST2, the liquid crystal molecules are pivoted to the right (clockwise). In this state, after the backlight passes through the liquid crystal display panel LPN, the backlight is affected by birefringence of the liquid crystal molecules and modulated, and at least a portion of a component thereof passes through the polarizer included in the optical device OD2 (i.e., displayed in white).

The liquid crystal display device further includes a plurality of common wires COM, a voltage supply wire W1, a control circuit serving as a control mechanism, not shown, a first switching circuit SW1 serving as a first switching mechanism, a second switching circuit SW2 serving as a second switching mechanism, a third switching circuit SW3 serving as a third switching mechanism, a gate open circuit GC serving as an output timing switching mechanism, a gate buffer circuit GBF, and a scanning line drive circuit GD.

The plurality of common wires COM (COM1 to COMn/3) are formed on the insulating substrate 20 in an electrically independent manner from each other. In this case, the common wires COM are respectively connected to the plurality of common electrodes ET of the plurality of pixels PX for three lines. The common wires COM as well as the common electrode ET also serve as wires for detecting change of electrostatic capacitance caused by input (contact) to the display surface with the input unit 60. In this embodiment, the display surface is the surface of the optical device OD1.

The voltage supply wiring W1 is formed on the insulating substrate 20 outside of the display region R1. Since a DC common voltage is applied to the voltage supply wire W1, the voltage supply wire W1 can supply the common voltage to the outside.

The control circuit outputs a SHUT signal (control signal), and functions as a drive switching means for switching between a normal drive and a power-OFF drive.

The first switching circuit SW1 includes a plurality of first switching elements S2 connected between ends of the plurality of common wires COM and the voltage supply wire W1. The first switching element S2 can switch the common wire COM and the voltage supply wire W1 into either conductive state or non-conductive state based on the SHUT signal given by the control circuit.

The second switching circuit SW2 includes a plurality of second switching elements S3 connected between ends of the plurality of signal lines SL and the voltage supply wire W1. The second switching element S3 switches the signal lines SL and the voltage supply wire W1 into either conductive state or non-conductive state based on the SHUT signal given by the control circuit.

The third switching circuit SW3 includes a plurality of third switching elements S4 connected between the other ends of the plurality of signal lines SL and the signal line drive circuit 40. The third switching element S4 can switch the state into either conductive state, in which a video signal can be output to the signal lines SL, or non-conductive state based on the SHUT signal given by the control circuit.

Ends of the plurality of scanning lines GL are connected to the scanning line drive circuit GD via the gate open circuit GC and the gate buffer circuit GBF. The scanning line drive circuit GD can output the first scanning signal in order in association with the plurality of scanning lines GL.

The gate open circuit GC is connected between the gate buffer circuit GBF and the scanning line drive circuit GD. The gate open circuit GC includes a NOT circuit GCA and a NAND circuit GCB. The NOT circuit GCA serves as a NOT circuit receiving the first scanning signal from the scanning line drive circuit GD. The NAND circuit GCB serves as a NAND circuit receiving the SHUT signal given by the control circuit and the first scanning signal passed through the NOT circuit GCA.

The gate open circuit GC outputs, from the NAND circuit GCB, a second scan signal for switching the pixel switch SWP into conductive state. The gate open circuit GC switches timing of output of the second scanning signal based on the first scanning signal given by the scan line drive circuit GD and the SHUT signal given by the control circuit. The second scanning signal is supplied to the buffer of the gate buffer circuit GBF, and is output to the scanning line GL via the buffer.

Figure 2:
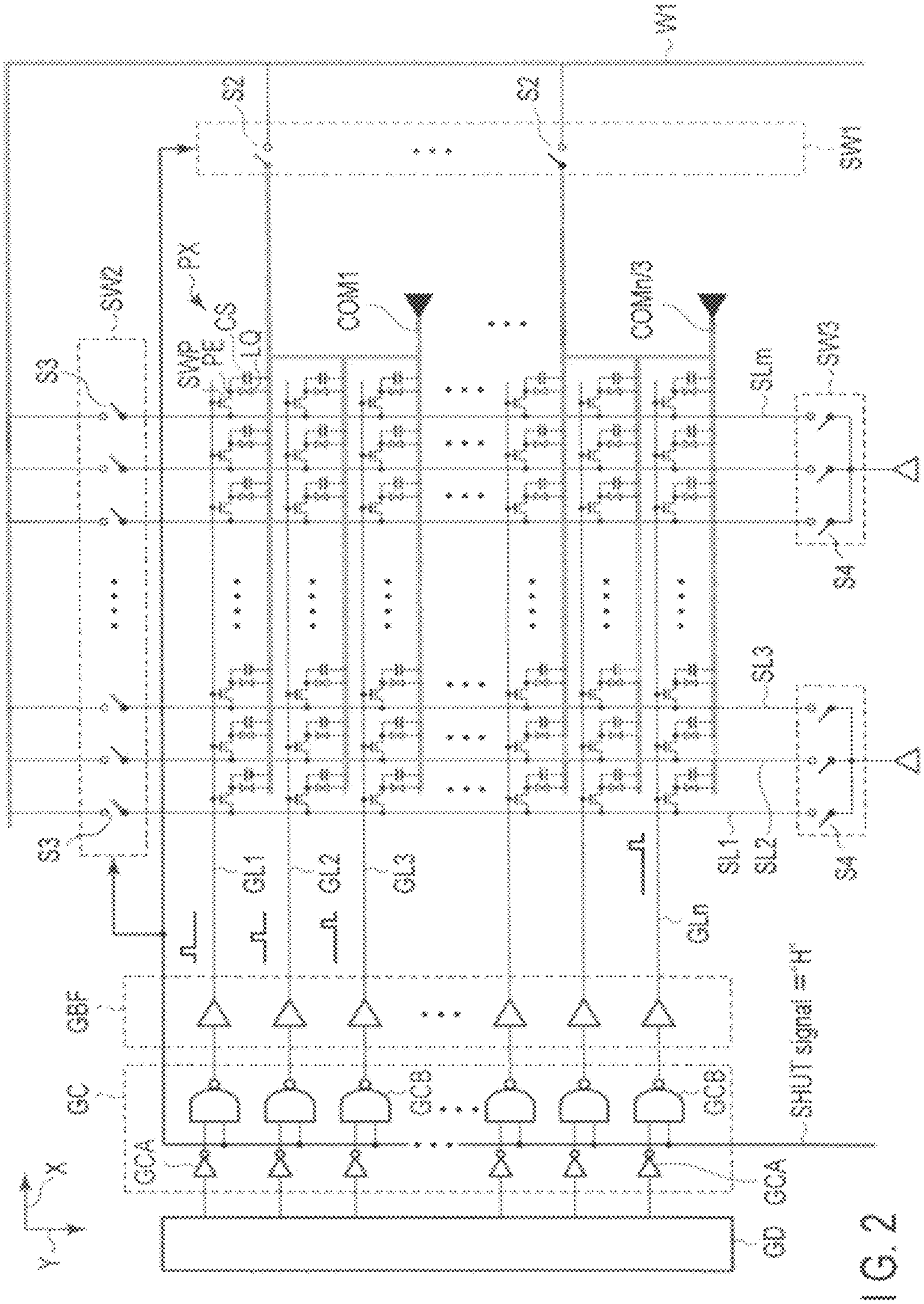
FIG. 2 is a figure illustrating a circuit configuration of the liquid crystal display device, and is a figure for explaining an example of operation during normal driving.
Figure 3:
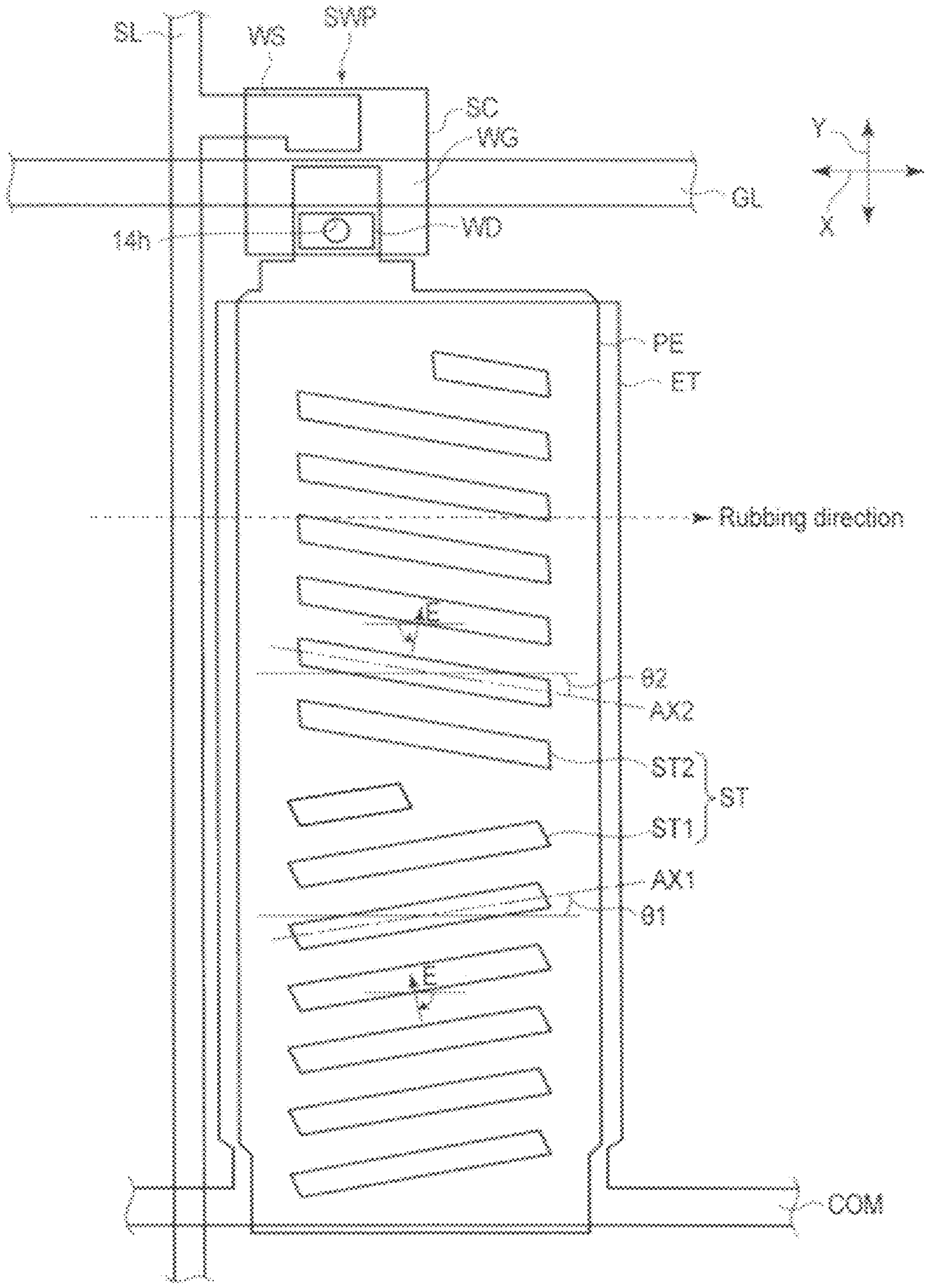
FIG. 3 is a plan view schematically illustrating a pixel of the liquid crystal display device, and is a figure schematically illustrating structures of a pixel electrode and a common electrode.
Figure 4:
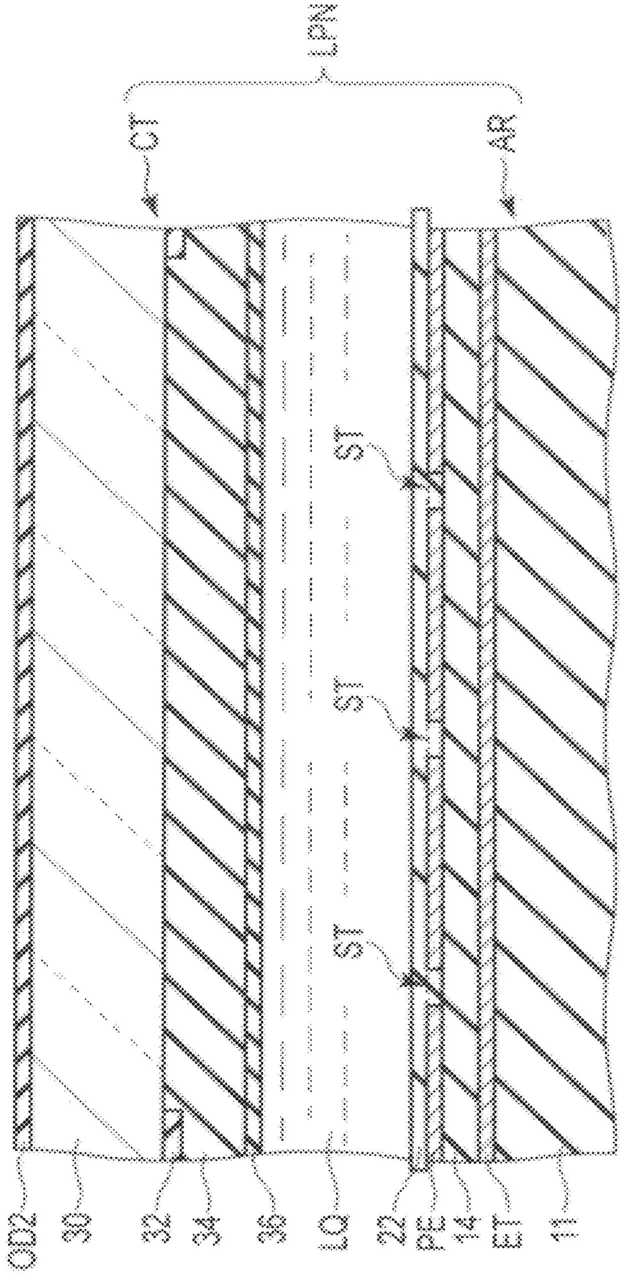
FIG. 4 is a figure schematically illustrating a cross sectional structure of the liquid crystal display device.
Figure 5:
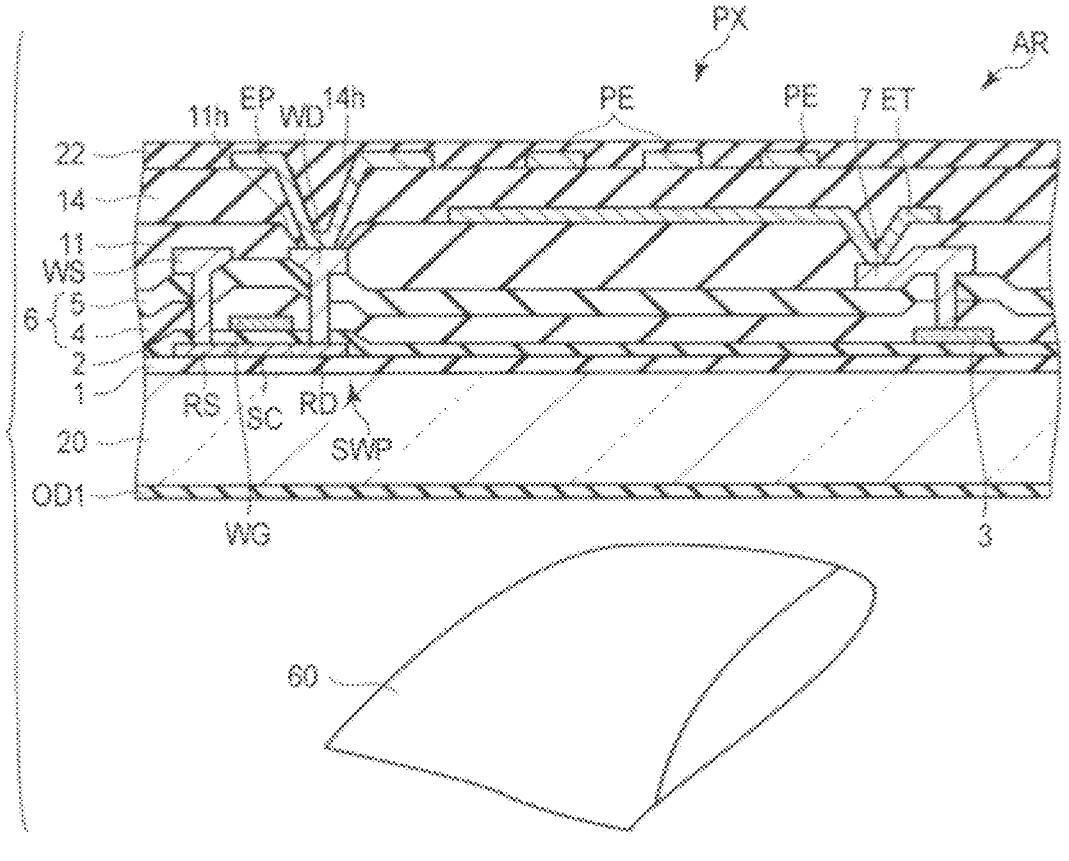
FIG. 5 is a figure schematically illustrating a cross sectional structure of an array substrate of the liquid crystal display device, and is a figure illustrating a state where electrostatic capacity coupling is increased/decreased with the common electrode according to input operation with an input means.

As shown in FIG. 2, when the power is turned on, and the normal display drive is performed in which the video signal is supplied to the pixel electrodes PE, the control circuit outputs a SHUT signal of a high (H) level, i.e., a first level. In this display period, DC common voltages, which are the same, are respectively supplied to the plurality of common wires COM. In a period in which contact to the display surface (input position information) is detected, independent detection signals are respectively supplied to the plurality of common wires COM.

It should be noted that, within one frame, the liquid crystal display is rewritten by successively scanning rows like an ordinary liquid crystal display device, and contact to the display surface is detected in a vertical blanking interval, so that not only display of an image but also detection of contact to the display surface can be performed. Contact to the display surface is detected by detecting information arising from increase/decrease of electrostatic capacitance coupling generated in the common electrode ET (first electrode) according to input operation with the input unit 60.

More specifically, the plurality of first switching elements S2 of the first switching circuit SW1 and the plurality of second switching elements S3 of the second switching circuit SW2 are all switched to non-conductive state (OFF) according to the SHUT signal at H level. The NAND circuit GCB receives the first scanning signal and the SHUT signal at H level, and accordingly, the NAND circuit GCB outputs the second scanning signal with the same timing as the first scanning signal. As a result, the second scanning signal is output via the gate buffer circuit GBF to the scanning line GL.

Figure 6:
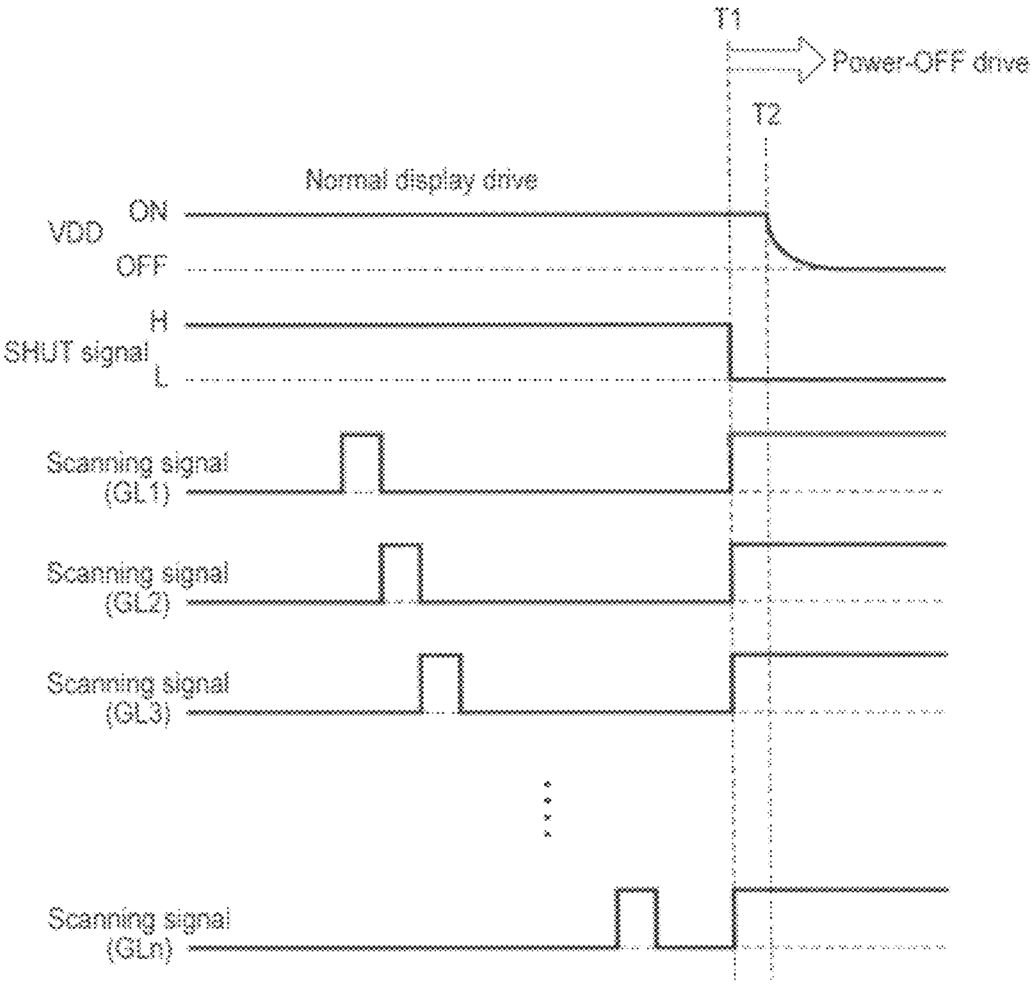
FIG. 6 is a timing chart for explaining an example of a method of driving the liquid crystal display device.

As shown in FIG. 6, the scanning lines GL are driven in order in each horizontal scanning period.

The plurality of third switching elements S4 of the third switching circuit SW3 are successively turned on in one horizontal period, and the video signal output from one output terminal of the signal line drive circuit 40 is supplied to three signal lines SL. The video signal supplied to the signal lines SL is supplied via the pixel switch SWP to the pixel electrode PE. The polarity of the potential charged in the pixel electrode PE is alternately switched to positive and negative in each frame with respect to the DC common voltage, so that the liquid crystal can be driven with the alternate current.

Figure 7:
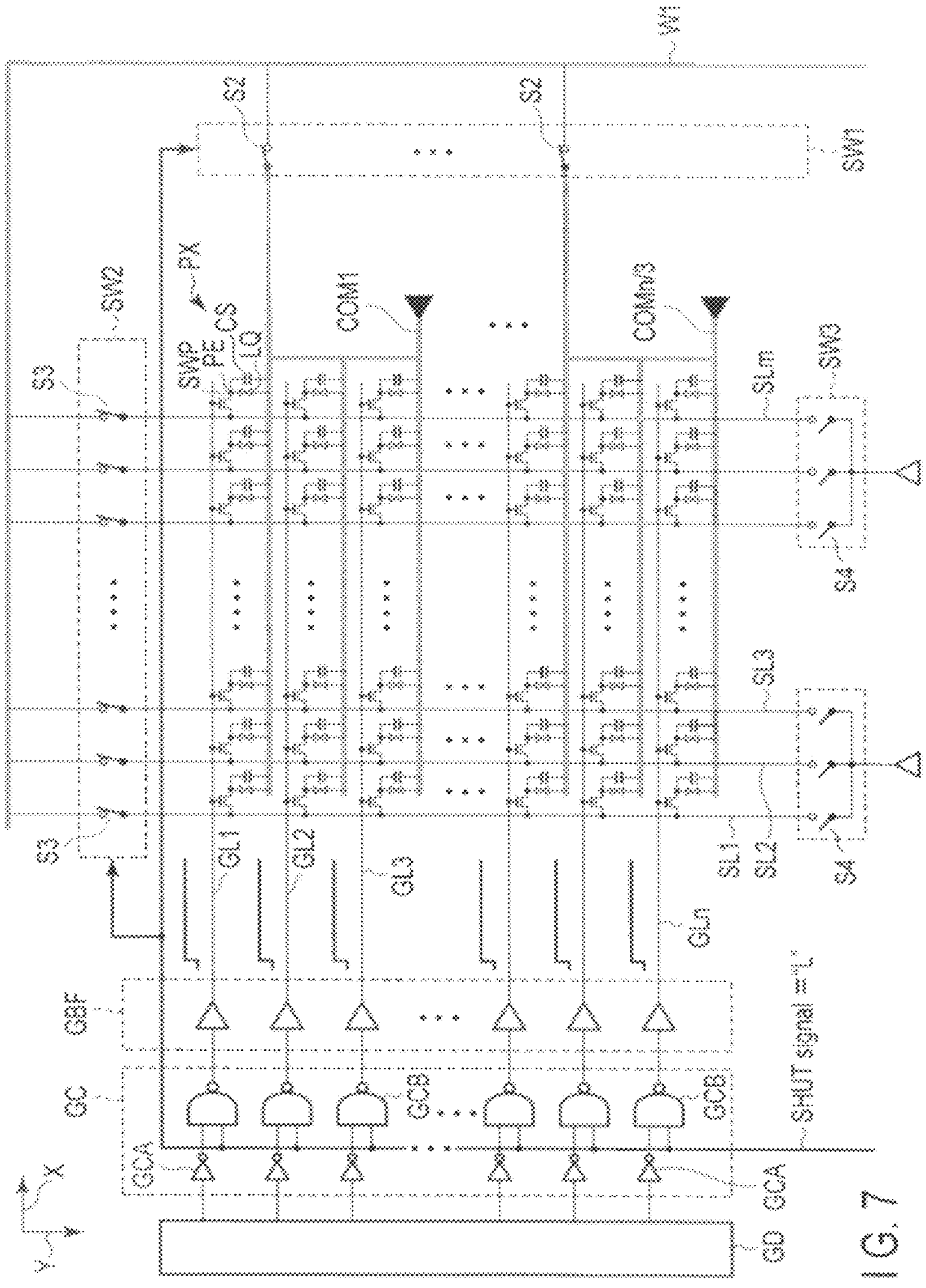
FIG. 7 is a figure illustrating a circuit configuration of the liquid crystal display device, and is a figure for explaining an example of operation during OFF-driving.

When the power is turned off, and the liquid crystal display device performs OFF drive as shown in FIGS. 6 and 7, the control circuit starts OFF drive, and outputs a SHUT signal of a low (L) level, i.e., a second level. From timing T1 at which the power is turned off, the control circuit starts OFF drive, and for example, at timing T2 at which a predetermined period of time passed, a switch inserted into a power supply line (not shown) to the control circuit is turned off. During the normal drive, a power supply voltage VDD is supplied to the power supply line.

The plurality of first switching elements S2 of the first switching circuit SW1 and the plurality of second switching elements S3 of the second switching circuit SW2 are all switched to conductive state (ON) according to the SHUT signal at L level. The switching elements S4 of the third switching circuit SW3 are all turned off according to the SHUT signal. The plurality of third switching elements S4 of the third switching circuit SW3 are all switched to non-conductive state (OFF) according to the SHUT signal at L level. Therefore, the common voltage is supplied from the voltage supply wire W1 to all the signal lines SL and the common wires COM in the conductive state with the voltage supply wire W1.

Since the NAND circuit GCB receives the SHUT signal at L level, the NAND circuit GCB outputs the second scanning signal via the gate buffer circuit GBF to all the scanning lines GL at the same time. As a result, all the pixel switches SWP are switched to conductive-state (ON) at a time.

Therefore, the same common voltage is supplied to all the pixel electrodes PE and all the common electrodes ET. The potential of the pixel electrode PE and the potential of the common electrode ET are the same value, and therefore, the value of the potential difference between the pixel electrode PE and the common electrode ET for controlling the alignment state of the liquid crystal molecules becomes zero, and the display unit is in black display state.

According to the liquid crystal display device according to an embodiment and the method of driving the liquid crystal display device having the above configuration, when the liquid crystal display device performs OFF drive, the signal corresponding to black display can be supplied to the plurality of pixel electrodes PE at a time, and a time required to charge the pixel electrodes PE (time from timing T1 to timing T2) can be reduced. The plurality of common wires COM are wires electrically independent from each other, but the common voltage is supplied to all of them with the first switching circuit SW1. Therefore, the discharge times of all the common wires COM after the supply of the power supply voltage VDD is turned off are substantially the same.

For this reason, writing of the signal corresponding to black display is completed before the power supply voltage VDD is turned off, and no residual image is displayed after the supply of the power supply voltage VDD is turned off. Further, even when the power supply of the liquid crystal display device is abruptly turned off, signal writing process to the pixel electrodes PE and the common electrode ET can be finished before the supply of the power supply voltage VDD from the power supply line is turned off.

For this reason, even when the power supply is abruptly turned off, black can be displayed without any residual image without considering the potential of the second electrode as a premise.

As described above, the liquid crystal display device and the method for driving the liquid crystal display device capable of avoiding occurrence of residual image when the power supply is turned off can be obtained.

It should be noted that Jpn. Pat. Appln. KOKAI Publication No. 2005-49849 also discloses a method for suppressing unevenness of display caused by residual charges in a liquid crystal display device. However, Jpn. Pat. Appln. KOKAI Publication No. 2005-49849 is based on such a driving that change of a voltage of an accumulation capacitance line is overlaid on a pixel potential, and the accumulation capacitance line cannot also serve as a wire for detecting change of electrostatic capacitance caused by contact to a display surface. For this reason, the residual image erasing method disclosed in Jpn. Pat. Appln. KOKAI Publication No. 2005-49849 cannot be applied to the embodiments of the present application.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The liquid crystal display device and the method for driving the liquid crystal display device according to the present invention is not limited to the liquid crystal display device and the method for driving the liquid crystal display device according to the above embodiments, and can be applied to various kinds of liquid crystal display devices and drive methods for the liquid crystal display devices.

For example, the liquid crystal display devices according to the above embodiments are the liquid crystal display devices of the FFS method, but may be a liquid crystal display device that reverses the polarity of the potential applied to the liquid crystal layer LQ by changing the potential of the pixel electrode PE in each frame using a DC common voltage.

The second electrode is not limited to the common electrode ET, and can be changed in various manners. The second electrode may be formed on the counter substrate CT, and it may be an electrode as long as it can apply the electric field formed between the plurality of first electrodes (pixel electrodes PE) to the liquid crystal layer LQ.

The control mechanism is not limited to the above control circuit, and can be changed in various manners. The control mechanism may be any mechanism as long as it can output the control signal. For example, the control mechanism may be a socket for a power supply device (battery pack). In this case, when the power supply device is detached from the socket, the socket may be formed to output the control signal.

The liquid crystal display device is not limited to normally black, and may be normally white.

What is claimed is:

1. A liquid crystal display device comprising:
a first substrate;
a second substrate arranged opposite to the first substrate;
a liquid crystal layer held between the first substrate and the second substrate;
a plurality of scanning lines provided on the first substrate and extending in a row direction;
a plurality of signal lines provided on the first substrate and extending in a column direction;
a plurality of pixel switches provided on the first substrate and electrically connected to the scanning lines and the signal lines;
a plurality of first electrodes arranged in a matrix form on the first substrate and electrically connected to the pixel switches;
a scanning line drive circuit configured to output a first scanning signal in order in association with the scanning lines;
a second electrode provided on the first substrate or the second substrate and configured to apply an electric field produced between the second electrode and the first electrodes to the liquid crystal layer;
a voltage supply wiring configured to supply a common voltage;
a control mechanism configured to output a control signal;
a first switching mechanism connected between the second electrode and the voltage supply wiring and configured to switch the second electrode and the voltage supply wiring into either conductive state or non-conductive state based on the control signal given by the control mechanism;
a second switching mechanism connected between the signal lines and the voltage supply wiring and configured to switch the signal lines and the voltage supply wiring into either conductive state or non-conductive state based on the control signal given by the control mechanism; and
an output timing switching mechanism configured to connect between the scanning lines and the scanning line drive circuit, receive the first scanning signal from the scanning line drive circuit and the control signal from the control mechanism, and simultaneously output a second scanning signal of switching the pixel switch into conductive state to the scanning lines, based on the control signal.

2. The liquid crystal display device according to claim 1,
wherein when a power supply is turned off, the control mechanism outputs the control signal, based on the control signal, the output timing switching mechanism simultaneously outputs the second scanning signal to the scanning lines, the first switching mechanism switches the second electrode and the voltage supply wiring into conductive state, the second switching mechanism switches the signal lines and the voltage supply wiring into conductive state, and the common voltage is supplied to the first electrodes and the second electrode.

3. The liquid crystal display device according to claim 1, wherein while a power supply is ON, the control mechanism outputs a control signal at a first level, based on the control signal at the first level, the output timing switching mechanism outputs the second scanning signal to the scanning lines in order, the first switching mechanism switches the second electrode and the voltage supply wiring into non-conductive state, the second switching mechanism switches the signal lines and the voltage supply wiring into non-conductive state, and wherein when the power supply is turned off, the control mechanism outputs a control signal at a second level, based on the control signal at the second level, the output timing switching mechanism simultaneously outputs the second scanning signal to the scanning lines, the first switching mechanism switches the second electrode and the voltage supply wiring into conductive state, the second switching mechanism switches the signal lines and the voltage supply wiring into conductive state, and the common voltage is supplied to the first electrodes and the second electrode.

4. The liquid crystal display device according to claim 3, wherein the control signal at the first level is a control signal at a high level, and the control signal at the second level is a control signal at a low level.

5. The liquid crystal display device according to claim 1 further comprising a third switching mechanism configured to connect the signal lines and switch whether a video signal is output to the signal lines, wherein the first switching mechanism comprises a plurality of first switching elements configured to connect between the second electrode and the voltage supply wiring and switch the second electrode and the voltage supply wiring into either conductive state or non-conductive state, based on the control signal, the second switching mechanism comprises a plurality of second switching elements configured to connect between the signal lines and the voltage supply wiring and switch the signal lines and the voltage supply wiring into either conductive state or non-conductive state, based on the control signal, the third switching mechanism comprises a plurality of third switching elements configured to connect the signal lines and switch the state into either conductive state, in which a video signal is output to the signal lines, or non-conductive state, based on the control signal, the output timing switching mechanism comprises a NOT circuit configured to receive the first scanning signal from the scanning line drive circuit and a NAND circuit configured to receive the control signal and the first scanning signal passed through the NOT circuit, wherein while a power supply is ON, the control mechanism outputs a control signal at a first level, based on the control signal at the first level, all the first switching elements and the second switching elements are switched to non-conductive state, the second scanning signal is output to the scanning lines in order, and the video signal is output to the signal lines in order, and wherein when the power supply is turned off, the control mechanism outputs a control signal at a second level, based on the control signal at the second level, all the first switching elements and the second switching elements are switched to conductive state, all the third switching elements are switched to non-conductive state, and the second scanning signal is simultaneously output to the scanning lines.

6. The liquid crystal display device according to claim 5, wherein the control signal at the first level is a control signal at a high level, and the control signal at the second level is a control signal at a low level.

7. A method of driving a liquid crystal display device, the liquid crystal display device comprising: a first substrate; a second substrate arranged opposite to the first substrate; a liquid crystal layer held between the first substrate and the second substrate; a plurality of scanning lines provided on the first substrate and extending in a row direction; a plurality of signal lines provided on the first substrate and extending in a column direction; a plurality of pixel switches provided on the first substrate and electrically connected to the scanning lines and the signal lines; a plurality of first electrodes arranged in a matrix form on the first substrate and electrically connected to the pixel switches; a scanning line drive circuit configured to output a first scanning signal in order in association with the scanning lines; a second electrode provided on the first substrate or the second substrate and configured to apply an electric field produced between the second electrode and the first electrodes to the liquid crystal layer; a voltage supply wiring configured to supply a common voltage; a control mechanism configured to output a control signal; a first switching mechanism connected between the second electrode and the voltage supply wiring and configured to switch the second electrode and the voltage supply wiring into either conductive state or non-conductive state based on the control signal given by the control mechanism; a second switching mechanism connected between the signal lines and the voltage supply wiring and configured to switch the signal lines and the voltage supply wiring into either conductive state or non-conductive state based on the control signal given by the control mechanism; and an output timing switching mechanism configured to connect between the scanning lines and the scanning line drive circuit, receive the first scanning signal from the scanning line drive circuit and the control signal from the control mechanism, and simultaneously output a second scanning signal of switching the pixel switch into conductive state to the scanning lines, based on the control signal, the method comprising:

outputting the control signal, when a power supply is turned off; and simultaneously outputting the second scanning signal to the scanning lines, switching the second electrode and the voltage supply wiring into conductive state, switching the signal lines and the voltage supply wiring into conductive state, and supplying the common voltage to the first electrodes and the second electrode, based on the control signal.

* * * * *